Dec. 6, 1938.     J. W. LEE     2,139,414
METHOD AND APPARATUS FOR VULCANIZING RUBBER STRIPS
Filed Dec. 24, 1935
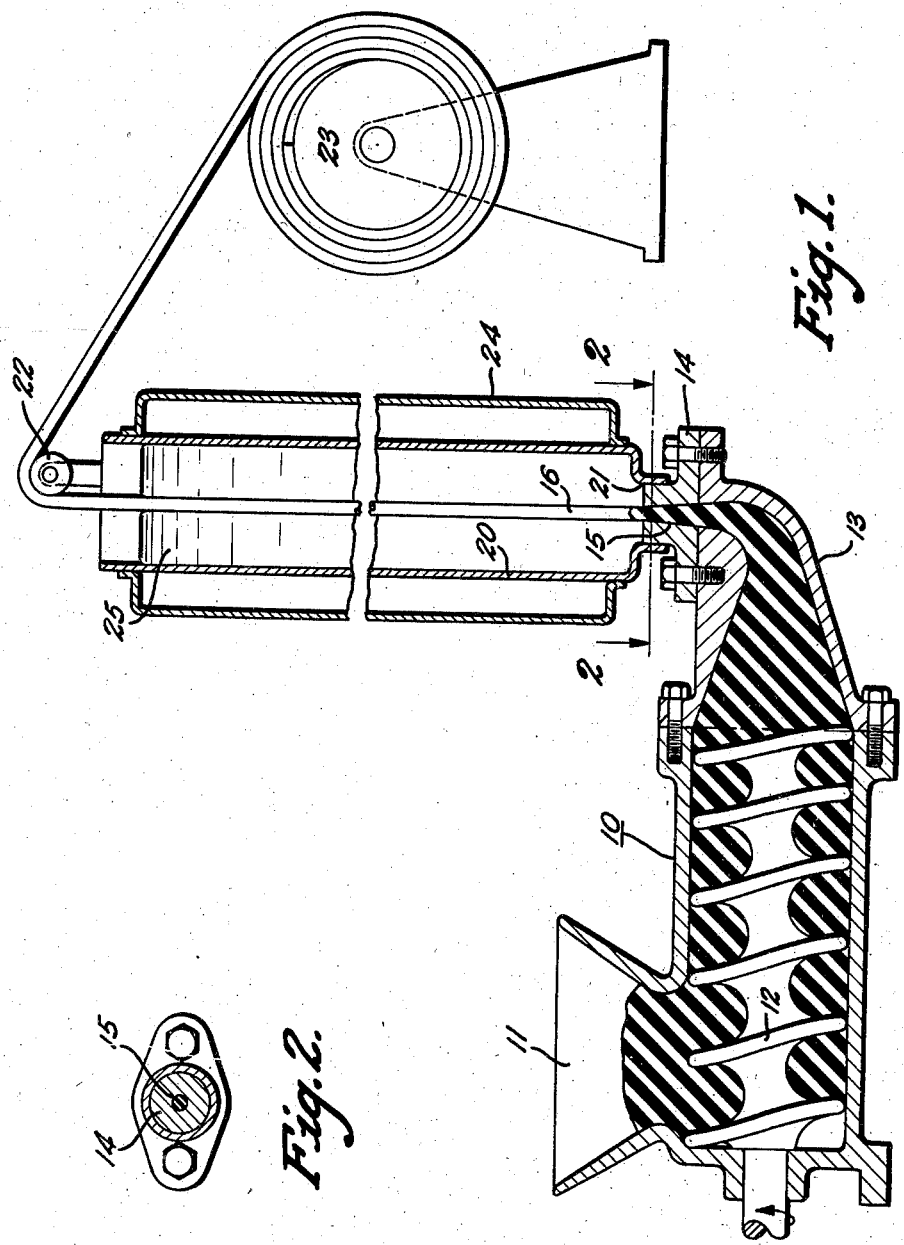
INVENTOR
John W. Lee
BY
Spencer Hardman & Fehr
HIS ATTORNEYS Patented Dec. 6, 1938

2,139,414

UNITED STATES PATENT OFFICE 2,139,414

METHOD AND APPARATUS FOR VULCANIZING RUBBER STRIPS

John Wesley Lee, Dayton, Ohio, assignor to General Motors Corporation, Detroit, Mich., a corporation of Delaware Application December 24, 1935, Serial No. 56,027

5 Claims. (Cl. 18—6)

This invention relates to a method of curing by heat and pressure long strips of plastic material such as rubber.

An object of this invention is to provide a means and method of making long strips of cured plastic material, such as rubber or the like, where such strips are of considerable length and of the same section thruout, such as rubber tubing, wind lacing, window molding, and the like.

A further object of the invention is to provide a method of curing such long strips by heat and external pressure thereupon but without the necessity of using molds for maintaining the proper shape of the section of the strips during curing.

A more specific object is to provide a method of making such long strips by extruding the uncured plastic material thru a die directly into a heated liquid and using the heat and hydrostatic pressure of this surrounding liquid to properly cure the strip as it passes therethru.

Further objects and advantages of the present invention will be apparent from the following description, reference being had to the accompanying drawing wherein a preferred embodiment of the present invention is clearly shown.

In the drawing:

Fig. 1 is a somewhat diagrammatic view illustrating this invention and shows a section thru one form of apparatus for carrying out the method of this invention.

Fig. 2 is a section on line 2—2 of Fig. 1 and shows a form of extrusion die for making a simple circular section strip.

Reference numeral 10 designates the extruding machine which may be any standard type of rubber tubing machine of the proper capacity. The uncured plastic compound is inserted in the hopper 11 and is forced by the power driven spiral screw 12 out thru the special up-turned outlet head 13 and extrusion die 14 which has a round hole 15 therein thru which the plastic material is forced with high pressure. A long vertically arranged tube 20 is fixed directly to the extrusion die 14 at the leak-proof joint 21, so that when the extruded strip 16 emerges from the hole 15 it immediately enters tube 20 at its bottom end. The strip 16 is led vertically up thru tube 20 and passes out at the top thereof. In the drawing the strip 16 is shown as passing over a guide sheave 22 and thence to a conveniently arranged storage reel 23 upon which the finished strip may be wound in continuous length.

The tube 20 is filled to the desired height with a suitable heated liquid 25 which forms the curing medium and provides both the necessary heat and external pressure upon the strip 16 while it is being cured. The liquid 25 in tube 20 may be heated to the desired temperature by any suitable means, preferably by means of a surrounding steam jacket 24. The liquid used as the curing medium should preferably be inert relative to the compound composing the strip 16, that is, it should have no harmful chemical action thereupon. This liquid 25 should preferably also have a greater specific gravity than the compound composing strip 16 so that strip 16 will at all times tend to float in the liquid 25 in a straight line from the extrusion hole 15 to top surface of the liquid. Also of course, the greater the specific gravity of the liquid 25 the less will be the vertical head of liquid necessary to give the desired predetermined external pressure upon strip 16 while it is being cured therein.

Now if strip 16 is to be of vulcanized soft rubber, the liquid 25 may be water and the height of the water column must be made such that the hydrostatic pressure of the water at the extrusion die 15 will be great enough to provide the proper external pressure upon strip 16 at the beginning of its vulcanization. For instance, if an external pressure of 20 lbs. per square inch upon strip 16 is desired a water column of 46 feet will be necessary. And if an external pressure of 40 lbs. per square inch is desired, a water column of about 92 feet high will be necessary. This seems at first glance to be an impracticable height, but when it is noted that the tube 20 and its steam jacket 24 may be made from ordinary piping and joined together as desired and require no actuating mechanism, it will be seen that the initial cost of such an arrangement will still be small as compared to that of any known type of solid pressure molds together with the necessary actuating mechanism.

However a heavier liquid may be substituted for water to form the vulcanizing medium for the soft rubber strip 16, and thus greatly reduce the required height of the tube 20. Under certain circumstances liquid mercury may be used for the curing liquid 25, in which event the liquid column need be only 41 inches high to give 20 lbs. per square inch external pressure upon strip 16 at the extrusion die 15, and only 82 inches high to give 40 lbs. per square inch.

In operation, the uncured strip 16 is extruded directly into the heated liquid 25 and passes upwardly therethru at such a predetermined speed as will give sufficient time for the curing of each portion of the strip to be completed by the time it passes from the top surface of liquid 25. The rate of travel of strip 16 is controlled by the speed of the extruding machine 10. It is clear that as the degree of curing progresses from zero to 100% the external pressure will decrease from its maximum at die 15 to zero at the surface of liquid 25. This facilitates the proper vulcanization of the rubber strips since a greater external pressure thereupon is needed at the time the rubber has little or no inherent strength of its own to resist its tendency to expand or blow during curing.

The strip 16 will be urged by the pressure of the surrounding liquid 25 to pass in a vertical straight line from the die hole 15 to the liquid surface, since if it deviates at all from this straight line at any instant the heavier liquid 25 will urge it to float straight up and this will immediately force the strip 16 back into its straight line path. Or in other words, the liquid 25 being heavier than the strip 16 will always force the strip to a position where it displaces the minimum volume of liquid, which position of course is a straight vertical line from extrusion hole 15 to the liquid surface. This effect of liquid 25 in holding strip 16 in a straight line renders it unnecessary to apply tension to said strip 16 from the top end thereof to hold it in a straight line, hence there will be no danger of pulling the strip in two at or near its lower end where it is weakest due to the minimum degree of cure that has taken place at that point. Since the cross-section of the strip is constant and the liquid 25 cannot act upon its bottom end, the buoyant force of the liquid upon the entire immersed length of strip 16 is quite small and is due merely to the fact that strip 16 is compressed to a somewhat smaller section at the lower end of tube 20 than it is near the upper end thereof. This small buoyant force aids in causing strip 16 to travel upwardly in a straight path to the sheave 22 but it does not cause any excessive tension in strip 16 at its lower end such as might break said strip in two where it is weakest.

In any case where the strip 16 has a greater specific gravity than the liquid 25 (such as is usually the case when water is used for liquid 25) means are provided to pull the upper end of strip 16 from the liquid at the same linear speed it is being extruded out of the extrusion hole 15. In this case the weight of the immersed length of strip 16 is sustained from the sheave 22 by tension in the strip less the above described small buoyant effect of the liquid on the strip. However the tensile load at any portion of the strip will decrease with the degree of cure already obtained by that portion from the top to the bottom of strip 16, and hence this tensile load may be carried.

While the embodiment of the present invention as herein disclosed, constitutes a preferred form, it is to be understood that other forms might be adopted, all coming within the scope of the claims which follow.

What is claimed is as follows:

1. The steps in the method of making a long strip of cured plastic material such as rubber, comprising: extruding the uncured plastic material thru a die directly into a heated liquid having such a high hydrostatic pressure as will provide the desired external pressure upon the extruded strip while curing said strip, and leading the extruded strip upwardly thru said heated liquid and progressively curing same by the heat and hydrostatic pressure applied thereto by said liquid.

2. The steps in the method of making a long strip of vulcanized rubber, comprising: extruding uncured rubber compound thru a die into a heated liquid at a point where said liquid has a high hydrostatic pressure, and preventing the escape of the liquid where the extruded strip enters same by the pressure of the extruded material upon the die walls, and leading the extruded rubber strip substantially vertically upwardly thru said liquid and progressively curing same by the heat and pressure applied thereto by said liquid.

3. The steps in the method of making a long strip of vulcanized rubber, comprising: extruding uncured rubber compound thru a die into a heated column of mercury at a point where said mercury has a high hydrostatic pressure; and leading the extruded rubber strip upwardly thru said heated mercury and progressively curing same by the heat and pressure applied thereto by said mercury.

4. The steps in the method of making a vulcanized rubber strip, comprising: progressively extruding a strip of plastic uncured rubber compound directly into a heated liquid under pressure, and vulcanizing the strip by the heat conducted directly thereto from the surrounding contacting liquid.

5. An apparatus for making a long continuous strip of vulcanized rubber compound, comprising: a container and a column of hot vulcanizing liquid therein, said column having such a substantial vertical head as to give the desired hydrostatic pressure therein, means for progressively extruding a continuous length of unvulcanized rubber compound directly into said hot liquid against the hydrostatic pressure thereof, and means for progressively passing said extruded length of rubber compound thru said hot liquid column from the extrusion inlet upwardly to the free surface thereof, whereby to vulcanize the rubber under a progressively decreasing hydrostatic pressure.

JOHN WESLEY LEE.